United States Patent Office 2,949,401
Patented Aug. 16, 1960

2,949,401

BUCCAL TABLET CONTAINING VITAMIN A

Irving B. Wershaw, New York, N.Y., assignor, by mesne assignments, to Dome Chemicals, Inc., Indianapolis, Ind., a corporation of Indiana No Drawing. Filed July 28, 1958, Ser. No. 751,138

9 Claims. (Cl. 167—81)

This invention relates to tablets containing vitamin A with or without vitamin C for oral administration, more particularly to buccal tablets containing vitamin A with or without vitamin C and to processes of making such tablets.

Such tablets are used in the treatment of oral leucoplakia and lichen planus. A prime desideratum of buccal tablets is that they (1) dissolve very slowly, ensuring constant bathing of the buccal mucosa and effective systemic utilization of the vitamin A, (2) have a pleasant taste and odor, (3) have a relatively high concentration of vitamin A per tablet, say at least 75,000 U.S.P. units, (4) are chemically stable for relatively long periods of time, of the order of at least three months, preferably longer, so that the tablets will not lose their vitamin A potency during storage in stoppered bottles or other closed containers before reaching the consumer, and (5) are relatively firm and hard, i.e. can withstand a pressure of at least 15 kilograms per square cm. A suitable test for determining the rate of dissolution of the tablet is the rate at which the tablet disintegrates in water at 37° C. The tablets of the present invention will not disintegrate in water at 37° C. in less than one hour.

It is among the objects of the present invention to provide a buccal tablet which combines the above noted properties to an exceptional and unusual extent. Other objects and advantages of this invention will be apparent from the following detailed description thereof.

In accordance with this invention, the buccal tablet contains from 10% to 20% vitamin A acetate, from .3% to .4% citric or tartaric acid, from 3% to 5% methyl cellulose, and from 0 to .02% ascorbic acid, the rest of the tablet being flavoring material and a filler which do not deleteriously affect the chemical stability of the vitamin A acetate and which impart improved binding properties, thus resulting in a hard firm tablet capable of withstanding a pressure of at least 15 kilograms per square cm. and which will not disintegrate in water at 37° C. in less than one hour. The ascorbic acid is employed whenever a tablet is desired containing vitamin C as well as vitamin A. As indicated, the invention contemplates tablets containing no vitamin C but only vitamin A.

As the vitamin A constituent of the tablet, vitamin A acetate is employed. Vitamin A acetate is available commercially under the name Vitamin A Crystalets in powdered form. The vitamin A acetate is compatible with the other constituents hereinafter enumerated and when compounded with these other constituents, remains chemically stable in the tablet for long periods of time, at least several months.

Methyl cellulose is available commercially under the trade name Methocel in the form of grayish white powder. The methyl cellulose creates a gummy (slippery-like) effect in the mouth when the tablet is permitted to disintegrate. In so doing, the walls of the mouth and tongue are coated, giving rise to a soothing emollient effect and allowing at the same time prolonged contact of the vitamin A and vitamin C, if used, with the surfaces of the mouth and tongue. Methyl cellulose in combination with the other constituents hereinafter enumerated and in the quantities specified is particularly desirable because it is bland and neutral to the taste, lacks astringency and does not deleteriously affect the vitamin A or C.

Citric acid of commerce is a white granular fine powder. It is odorless and has a strongly acid taste. It functions in the tablet not only to impart a lemon-like taste, but what is more important to stabilize the vitamin A and at the same time maintain a buffering activity in the mouth. The mouth, as is well known, is somewhat on the alkaline side. Due to the presence of the citric acid in the tablet, a concentration of hydrogen ion is maintained in the saliva as well as in the mucous surfaces of the tongue and mouth. The citric acid therefore acts as a buffer to neutralize the alkalinity of the mouth and promote the flow of saliva. This continuing supply of saliva causes a constant bathing of the surfaces of the mouth and tongue with the vitamin content of the tablet producing a constant medication. Tartaric acid gives substantially the same results as citric acid and may therefore be used in lieu of citric acid.

The fillers herein enumerated are employed not only for their primary purpose as a diluent to permit utilization of the active ingredient in an effective dosage, but also as a binder to produce a tablet having the desired hardness and slow rate of dissolution. The fillers hereinafter enumerated also improve the taste of the tablet. The preferred filler is a mixture of lactose and sucrose. Lactose, also known as milk sugar, is available in the trade as a white powder. It is odorless and has a faintly sweet taste. Sucrose, or powdered sugar, is available commercially as a fine white powder. It is also odorless and has a sweet taste. The mixture of lactose and sucrose thus functions both as a flavoring material and as a binder. Instead of lactose, other diluents such as dry starch, kaolin, sodium chloride, glucose, gum acacia, gelatin or starch can be used.

In addition to the sugar as a flavoring material, other flavors such as peppermint flavor, sodium saccharin and mono sodium glutamate, or mixtures thereof, can be used. The use of peppermint flavor supplies the well known mint and cool sensation of this material. Sodium saccharin increases the sweetness. Mono sodium glutamate imparts the characteristic meat flavor. Other flavoring constituents can, of course, be used.

Preferably but not necessarily, a lubricant is added to the powdered material before it is tableted. Magnesium stearate is the preferred lubricant because it does not detrimentally affect the stability of the vitamin content. The function of the lubricant, as is well known, is to prevent the powdered mixture from sticking to the punches and dies of the tableting machine.

In producing the buccal tablet of this invention, the lactose, sucrose, methyl cellulose, citric or tartaric acids are first thoroughly mixed, screened and then moistened with an alcohol having a boiling point of below about 90° C., which alcohol is not toxic, and water. Isopropyl alcohol or ethyl alcohol are preferred. The combined weight of the alcohol and water should be approximately equal to that of the other constituents with which the alcohol and water are mixed. The resultant mixture should be sufficiently moist to form plastic-like lumps. The mass thus produced is spread out on a tray to dry in a suitable oven at a temperature of about 150° F. for a period of time long enough to remove substantially all of the water and alcohol. Granules result which are substantially homogeneous insofar as the content of the diluent binder (lactose and sucrose) methyl cellulose and citric or tartaric acid are concerned. These granules are then screened through a 30 mesh screen producing particles having an average size of about 0.6 mm.

The vitamin A acetate is mixed with the lubricant (magnesium stearate) and the flavoring constituents and the resultant mixture then added to the screened granules. This mixture is thoroughly mixed and then compressed in tablets of the desired size, e.g. a tablet of 2.5 grams, using a conventional tableting machine, such as the well known Stokes machine.

*Example I*

In one example of the practice of this invention, 4,000 grams of lactose, 4,175 grams of sucrose, 34 grams of citric acid and 361 grams of methyl cellulose (Methocel 4,000) are thoroughly mixed with 5 litres of isopropyl alcohol and 5 litres of water. The resultant mixture is in the form of a doughy plastic mass which is spread out and dried in an oven at 150° F. until substantially all of the alcohol and water have been driven off leaving a dry mass. This dry mass is screened through a 30 mesh screen, producing granules of uniform composition.

1,200 grams of vitamin A acetate (containing 500,000 U.S.P. units of vitamin A per gram) are mixed with 144 grams of magnesium stearate, 40 grams of peppermint flavor, 23 grams of sucaryl, 3 grams of sodium saccharin and 20 grams of mono sodium glutamate. This mixture is then compressed into tablets in a Stokes tableting machine. Each tablet weighs 2.5 grams. The composition of each tablet is as follows:

| | Percent |
|---|---|
| Vitamin A acetate | 12 |
| Lactose | 40 |
| Sucrose | 41.75 |
| Methyl cellulose | 3.61 |
| Citric acid | .34 |
| Magnesium stearate | 1.44 |
| Peppermint flavor | .4 |
| Sucaryl | .23 |
| Sodium saccharin | .03 |
| Mono sodium glutamate | .2 |
| Total | 100.00 |

Other examples of this invention are as follows:

*Example II*

| | Percent |
|---|---|
| Vitamin A acetate | 18 |
| Lactose | 34 |
| Sucrose | 41.6 |
| Methyl cellulose | 4 |
| Tartaric acid | .35 |
| Magnesium stearate | 1.4 |
| Peppermint flavor | .4 |
| Ascorbic acid | .02 |
| Sodium saccharin | .03 |
| Mono sodium glutamate | .2 |
| Total | 100.00 |

*Example III*

| | |
|---|---|
| Vitamin A acetate | 10 |
| Lactose | 39.54 |
| Sucrose | 45 |
| Methyl cellulose | 3 |
| Citric acid | .4 |
| Magnesium stearate | 1.2 |
| Peppermint flavor | .4 |
| Sucaryl | .23 |
| Sodium saccharin | .03 |
| Mono sodium glutamate | .2 |
| Total | 100.00 |

*Example IV*

| | |
|---|---|
| Vitamin A acetate | 20 |
| Lactose | 31.4 |
| Sucrose | 43 |
| Methyl cellulose | 3 |
| Tartaric acid | .4 |
| Ascorbic acid | .02 |
| Magnesium stearate | 1.3 |
| Peppermint flavor | .4 |
| Sucaryl | .24 |
| Sodium saccharin | .04 |
| Mono sodium glutamate | .2 |
| Total | 100.00 |

The tablets of all of the above examples withstand pressure of at least 20 kilograms per square cm. without crumbling. When added to water at 37° C. they require considerably longer than an hour before disintegration.

It will be noted that the present invention provides a buccal tablet which has a pleasant taste, has a relatively high concentration of vitamin A per tablet in which the vitamin A is chemically stable for relatively long periods of time, which dissolves very slowly ensuring constant bathing of the buccal mucosa and effective systemic utilization of the vitamin A, which may or may not contain vitamin C, which will withstand pressure of at least 15 kilograms per square cm. and which will not disintegrate in less than one hour at 37° C.

Since certain changes may be made in carrying out the above described process of making the buccal tablet of this invention and since the composition of such buccal tablets may be varied somewhat without departing from the scope of this invention, it is intended that all matter contained in the above description shall be interpreted as illustrative and not in a limiting sense.

What is claimed is:

1. A buccal tablet having a hardness of at least 15 kilograms per square cm., which will not disintegrate when placed in water at 37° C. in less than one hour and consisting essentially of a thorough admixture of 10% to 20% by weight of vitamin A acetate, .3% to .4% by weight of an acid from the group consisting of citric and tartaric acids, 3% to 5% by weight of methyl cellulose, 0% to .02% by weight of ascorbic acid and 74% to 86% by weight of a filler chemically inert to the other constituents of the tablet.

2. A buccal tablet having a hardness of at least 15 kilograms per square cm., which will not disintegrate when placed in water at 37° C. in less than one hour and consisting essentially of a thorough admixture of 10% to 20% by weight of vitamin A acetate, .3% to .4% by weight of an acid from the group consisting of citric and tartaric acids, 3% to 5% by weight of methyl cellulose, and from 75% to 85% by weight of a filler from the group consisting of lactose, sucrose, glucose, starch, kaolin, gum acacia, gelatin, sodium chloride, mannitol and dicalcium phosphate.

3. A buccal tablet having a hardness of at least 15 kilograms per square cm., which will not disintegrate when placed in water at 37° C. in less than one hour and consisting essentially of a thorough admixture of about 12% by weight of vitamin A acetate, about .34% by weight of an acid from the group consisting of citric and tartaric acids, about 3.6% by weight of methyl cellulose, 0% to .02% by weight ascorbic acid, the rest being chiefly filler with a small amount of flavoring material, said filler being chemically inert to the other constituents of the tablet.

4. A buccal tablet as defined in claim 3, in which the filler is from the group consisting of lactose, sucrose, glucose, starch, kaolin, gum acacia, gelatin, sodium chloride, mannitol and dicalcium phosphate.

5. A buccal tablet having a hardness of at least 15 kilograms per square cm., which will not disintegrate when placed in water at 37° C. in less than one hour and consisting essentially of a thorough admixture of about 12% by weight of vitamin A acetate, about 40% by weight of lactose, about 41.75% by weight of sucrose, about 3.6% by weight of methyl cellulose, about .34% by weight citric acid, about 1.44% by weight magnesium stearate and about .40% by weight of a peppermint flavor.

6. A buccal tablet as defined in claim 5, in which the flavoring material is a mixture of peppermint flavor, sucaryl, sodium saccharin and mono sodium glutamate.

7. A process of producing buccal tablets which comprises the steps of thoroughly mixing from 3% to 5% by weight of methyl cellulose with from .3% to .4% by weight of an acid from the group consisting of citric and tartaric acids and from 75% to 86% by weight of a filler chemically inert to the other constituents of the tablet and having binding properties with water and a non-toxic alcohol boiling below about 90° C., the amount of alcohol and water by weight being approximately equal to the combined amounts of methyl cellulose, said acid and filler, to form a doughy mass, heating said doughy mass to drive off substantially all of the water and alcohol and form a substantially dry granular mass, screening the granular mass to form small granules having an average particle size not exceeding about .06 mm., adding from 10% to 20% by weight powdered vitamin A acetate to the screened granules and thoroughly mixing the resultant mixture, and then tableting the resultant mixture to produce buccal tablets having a hardness of at least 15 kilograms per square cm., which will not disintegrate when placed in water at 37° C. in less than an hour.

8. The process as defined in claim 7, in which the filler is from the group consisting of lactose, sucrose, glucose, starch, gum acacia, gelatin, kaolin, sodium chloride, mannitol and dicalcium phosphate.

9. A process of producing buccal tablets which comprises the steps of thoroughly mixing 3% to 5% by weight of methyl cellulose with from .3% to .4% by weight of citric acid and from 74% to 86% by weight of a filler chemically inert to the other constituents of the tablet and having binding properties with water and isopropyl alcohol, the amount of alcohol and water by weight being approximately equal to the combined amounts of methyl cellulose, citric acid and filler, to form a doughy mass, heating said doughy mass to drive off substantially all of the water and alcohol and form a substantially dry granular mass, screening the granular mass to form small granules having an average particle size not exceeding about .06 mm., adding a mixture containing from 10% to 20% powdered vitamin A acetate based on the total weight of the tablet and a small amount of flavoring material to the screened granules and thoroughly mixing the resultant mixture, and then tableting the resultant mixture to produce buccal tablets having a hardness of at least 15 kilograms per square cm., which will not disintegrate when placed in water at 37° C. in less than an hour.

References Cited in the file of this patent

UNITED STATES PATENTS

| | | |
|---|---|---|
| 2,410,417 | Andersen | Nov. 5, 1946 |
| 2,480,103 | Fux | Aug. 30, 1949 |
| 2,564,106 | Gribbins | Aug. 14, 1951 |